(12) United States Patent
Yamazaki

(10) Patent No.: US 12,741,687 B2
(45) Date of Patent: Sep. 22, 2026

(54) HANDS-ON DETECTION DEVICE AND COMPUTER PROGRAM

(71) Applicant: Autoliv Development AB, Vargarda (SE)

(72) Inventor: Yuki Yamazaki, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/726,001

(22) PCT Filed: Dec. 19, 2022

(86) PCT No.: PCT/JP2022/046561
§ 371 (c)(1),
(2) Date: Jul. 1, 2024

(87) PCT Pub. No.: WO2023/132211
PCT Pub. Date: Jul. 13, 2023

(65) Prior Publication Data

US 2025/0128752 A1 Apr. 24, 2025

(30) Foreign Application Priority Data

Jan. 6, 2022 (JP) ................................ 2022-001220

(51) Int. Cl.
*B62D 1/04* (2006.01)

(52) U.S. Cl.
CPC .................................. *B62D 1/046* (2013.01)

(58) Field of Classification Search
None
See application file for complete search history.

(56) References Cited

U.S. PATENT DOCUMENTS

| | | | | |
|---|---|---|---|---|
| 11,485,399 | B2 * | 11/2022 | Salter | H05B 3/03 |
| 2013/0307610 | A1 | 11/2013 | Salter et al. | |
| 2018/0017968 | A1 * | 1/2018 | Zhu | B60W 50/10 |
| 2018/0332663 | A1 * | 11/2018 | Lisseman | B60N 2/002 |

FOREIGN PATENT DOCUMENTS

| | | | |
|---|---|---|---|
| EP | 3501949 | A1 | 6/2019 |
| JP | 2012-129762 | A | 7/2012 |
| JP | 2012-173840 | A | 9/2012 |
| JP | 2017-177920 | A | 10/2017 |
| JP | 2017-182270 | A | 10/2017 |
| JP | 2019-119295 | A | 7/2019 |
| WO | 2017/168540 | A1 | 10/2017 |
| WO | 2017/168541 | A1 | 10/2017 |
| WO | 2019/235200 | A1 | 12/2019 |
| WO | 2021/235455 | A1 | 11/2021 |

* cited by examiner

*Primary Examiner* — Vicky A Johnson
(74) *Attorney, Agent, or Firm* — Matthew D. Thayne; Thayne and Davis LLC

(57) ABSTRACT

A hands-on detection device and a computer program that can simultaneously improve the speed of determining hands-on or hands-off and the accuracy of such determination. A hands-on detection ECU that performs hands-on detection of the rim part by passing a current through a sensor electrode provided on the rim part, hands-on detection being performed using two modes in which the current for the hands-on detection is different.

10 Claims, 8 Drawing Sheets

HANDS-ON DETECTION DEVICE AND COMPUTER PROGRAM

This application claims priority based on Japanese Application 2022-001220 filed Jan. 6, 2022, which is incorporated by reference in its entirety.

TECHNICAL FIELD

The present invention relates to a hands-on detection device and to a computer program.

BACKGROUND ART

Conventionally, technology that uses a sensor provided on a steering wheel to monitor whether or not a driver is gripping the rim part has been widely used.

For example, Patent Document 1 discloses a contact detection sensor that uses a switched capacitor method that captures events other than the object of detection, which is a human hand coming into contact with or approaching a door handle, as noise and so is not affected thereby, even when the water exposure of the door handle is high, enabling reliable detection of increase in capacitance and detecting the human hand.

RELATED ART DOCUMENTS

Patent Documents

Patent Document 1: Japanese Unexamined Patent Application Publication 2012-129762

SUMMARY OF THE INVENTION

Problem to be Solved by the Invention

In the switched capacitor method described above, a current is caused to flow into a capacitance connected to a sensor electrode to charge the capacitance, and when the electrode voltage of the sensor electrode reaches a certain voltage, the charging is stopped and an index related to the time constant associated with the charging (or discharging) of the electric charge at this time is measured. The measurement value for hands-on is different from the measurement value for hands-off (hereinafter referred to as hands-off measurement value); furthermore, the measurement value when gripping in a state of wearing gloves (hereinafter referred to as glove wearing measurement value) is different from the measurement value when gripping with a bare hand (hereinafter referred to as bare hand measurement value).

In general, in the switched capacitor method, the hands-off measurement value is largest, followed by the glove wearing measurement value and the bare hand measurement value. In addition, the hands-off measurement value and glove wearing measurement value are close to each other, while the bare hand measurement value is significantly different from the hands-off measurement value and the glove wearing measurement value. In other words, when gripping with a bare hand, the measurement time is longer than for hands-off and for gripping in a state of wearing gloves, causing inability to respond during such a long measurement time, resulting in a problem of lack of responsiveness.

This problem can be solved by increasing the current used for charging and thereby shortening the measurement time. However, since the hands-off measurement value and glove wearing measurement value are close to each other, if the current is increased, the hands-off measurement value and the glove wearing measurement value will become closer to each other, which generates another problem in that accurate identification becomes more difficult.

Patent Document 1 does not devise a solution to such a problem, and is therefore unable to solve it.

In light of these circumstances, an object of the present invention is to provide a hands-on detection device and computer program with increased speed in determination of hands-on or hands-off as well as simultaneous increase in determination accuracy.

Means for Solving the Problem

A hands-on detection device according to the present invention causes current to flow into an electrode provided in a rim part to perform hands-on detection on the rim part, wherein hands-on detection is performed using two modes with different currents for hands-on detection.

A computer program according to the present invention executes hands-on detection processing using two modes with different currents for hands-on detection in a computer that performs hands-on detection of a rim part by causing current to flow in an electrode provided in the rim part.

In the present invention, when hands-on detection is performed, one of the two modes is appropriately selected, and hands-on detection is performed in that mode. This makes it possible to improve both the speed of determining hands-on or hands-off as well as the accuracy of such determination.

Effect of the Invention

The present invention can provide a hands-on detection device and a computer program that can simultaneously improve the speed of determining a state of hands-on or hands-off and improve the accuracy of such determination.

DESCRIPTION OF THE PREFERRED EMBODIMENTS

The hands-on detection device according to an embodiment of the present invention will be described in detail below based on the diagrams.

Figure 1:
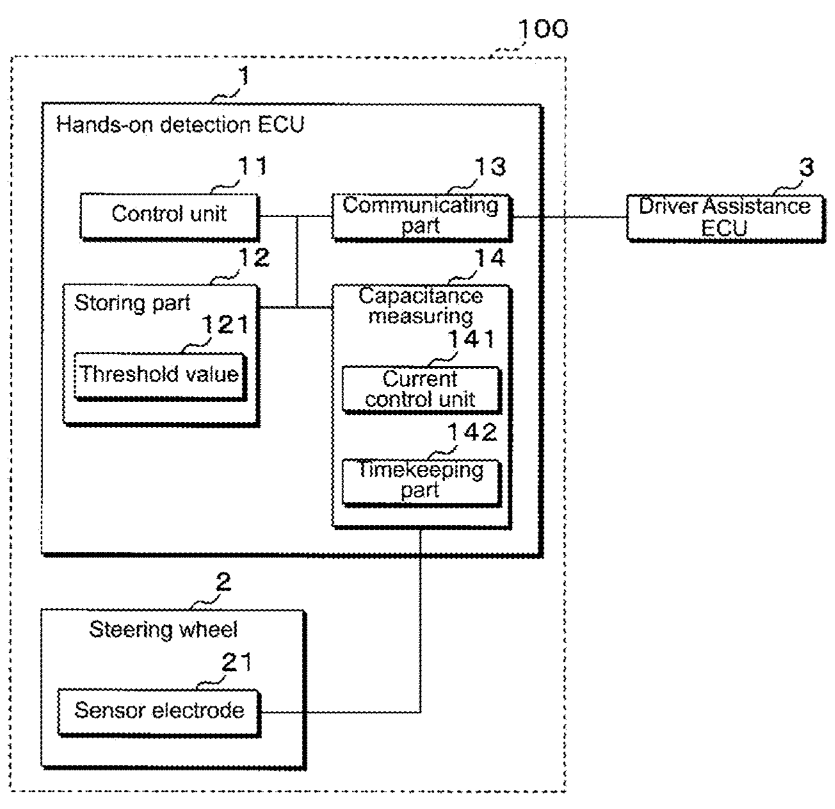
FIG. 1 is a block diagram depicting an example configuration of a steering wheel device according to the present embodiment.

FIG. 1 is a block diagram depicting an example configuration of a steering wheel device 100 according to the present embodiment. The steering wheel device 100 includes a steering wheel 2 and a hands-on detection ECU (Electronic Control Unit) 1. The hands-on detection ECU 1 (hands-on detection device) is communicatively connected to on-board equipment such as, for example, a driver assistance ECU 3 by an in-vehicle network installed in the vehicle.

Figure 2:
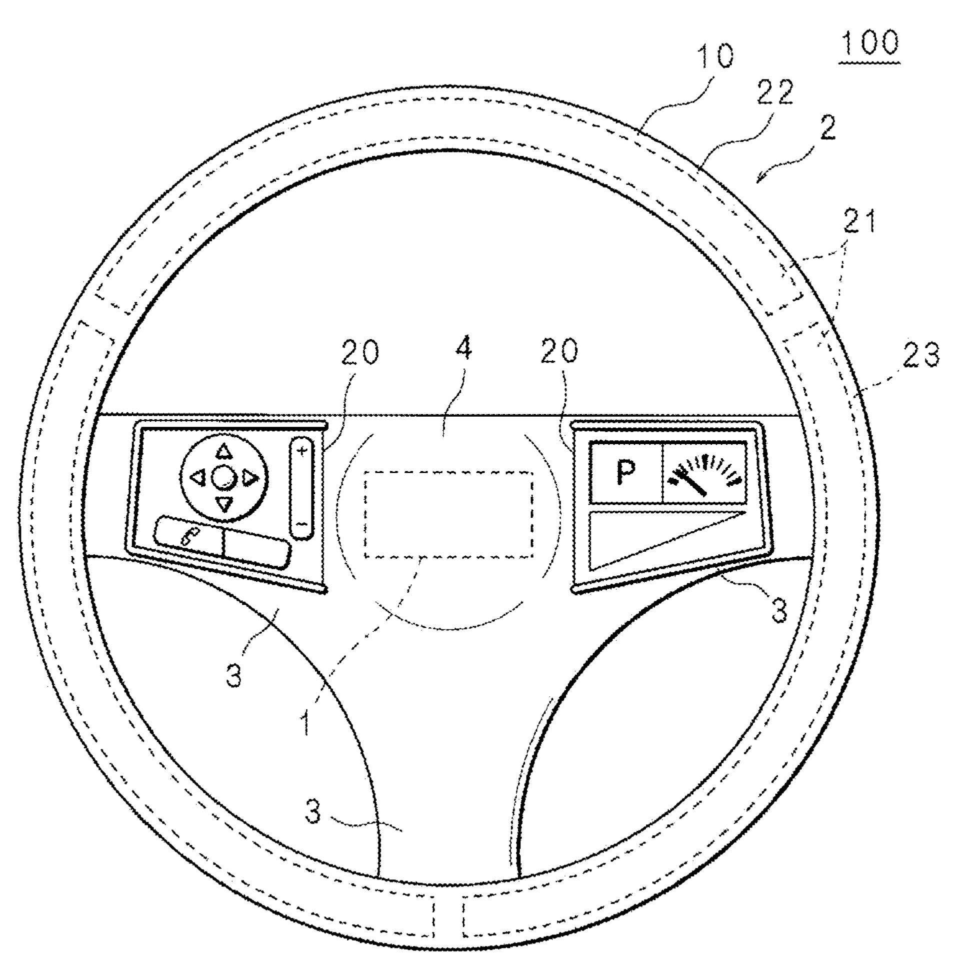
FIG. 2 is a front view of the steering wheel of the steering wheel device according to the present embodiment.

FIG. 2 is a front view of the steering wheel 2 of the steering wheel device 100 according to the present embodiment. The steering wheel 2 includes a sensor electrode 21, and the sensor electrode 21 is provided inside a rim part 10.

The hands-on detection ECU 1 performs hands-on detection. In detail, whether the steering wheel 2 (rim part 10) is in a hands-on state or a hands-off state is determined based on capacitance coupled to the sensor electrode 21. Here, the hands-on state is where the driver is gripping the steering wheel 2 and the hands-off state is a state of the driver having let go and not gripping the steering wheel 2. In addition, the hands-on detection ECU 1 determines whether or not an abnormality has occurred.

The hands-on detection ECU 1 includes a control unit 11 (hands-on detection part), a storing part 12, a communicating part 13, and a capacitance measuring circuit 14.

The storing part 12 includes memory elements such as Random Access Memory (RAM) and Read Only Memory (ROM), and the control unit 11 stores programs, data, or the like necessary for executing processing such as hands-on detection. In addition, the storing part 12 temporarily stores data or the like necessary for the control unit 11 to execute processing. Furthermore, the storing part 12 stores a threshold value 121 used in hands-on detection. The threshold value 121 includes threshold values TS1 and TS2 used for grip determination described below as well as threshold value TS3 used for abnormality determination described below.

The communicating part 13 is a communication interface for transmitting and receiving with other on-board devices via the in-vehicle network. The communicating part 13 is connected to a Local Area Network (LAN) provided in-vehicle and transmits and receives information with the driver assistance ECU 3 and the like. The communicating part 13 transmits the grip determination results based on the control unit 11 to the driver assistance ECU 3.

The driver assistance ECU 3 is an ECU for executing processing according to an advanced driver assistance system. The driver assistance ECU 3 receives a signal indicating grip determination results from the control unit 11 via the communicating part 13 and prescribed processing according to the advanced driver assistance system is executed based on these grip determination results.

For example, if grip determination results of hands-off state of the steering wheel 2 are received from the control unit 11 during autonomous driving, the driver assistance ECU 3 terminates autonomous driving. Note that driver assistance ECU 3 processing is not limited to autonomous driving and may be lane keep assist, parking assist, or the like.

The capacitance measuring circuit 14 is connected to the sensor electrode 21 and is an electrical circuit for detecting capacitance coupled to the sensor electrode 21. The capacitance measuring circuit 14 is able to detect capacitance between the sensor electrode 21 and vehicle ground GND (see FIG. 3).

Figure 3:
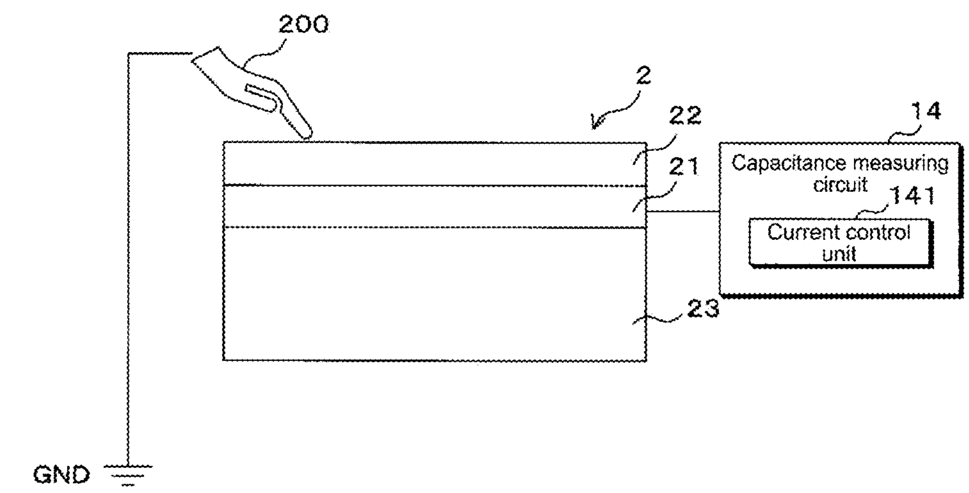
FIG. 3 is an explanatory diagram describing detection of capacitance using a capacitance measuring circuit of the steering wheel device.

FIG. 3 is an explanatory diagram describing detection of capacitance using a capacitance measuring circuit 14 of the steering wheel device 100. In FIG. 3, depiction of a timekeeping part 142 is omitted for convenience. The sensor electrode 21 is interposed between the coating layer 22 of the steering wheel 2 and the urethane layer 23 covering the core metal (not depicted).

As described above, the capacitance measuring circuit 14 is connected to the sensor electrode 21 of the steering wheel 2. The reference for the capacitance measuring circuit 14 is vehicle ground GND. The driver is not directly connected to vehicle ground GND but is capacitance coupled thereto.

Figure 4:
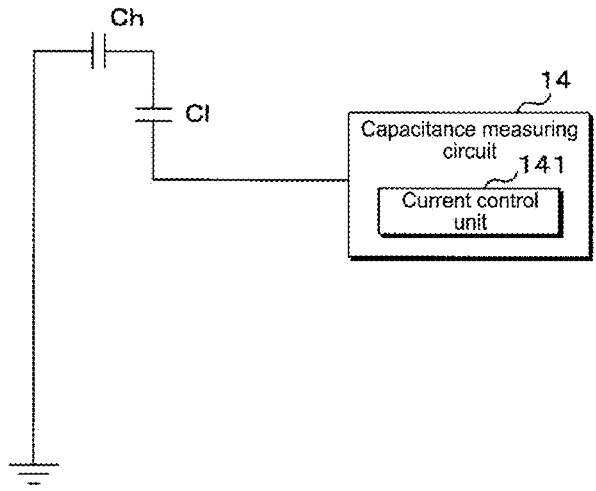
FIG. 4 is an equivalent circuit corresponding to FIG. 3.

FIG. 4 is an equivalent circuit corresponding to FIG. 3. In FIG. 4, Ch is the capacitance of the driver, and Cl is the capacitance constituted by the driver hand 200 and the sensor electrode 21. In other words, the capacitance measuring circuit 14 is connected to ground GND via the capacitance Cl and the capacitance Ch.

In this case, the detected capacitance (composite capacitance) Cm is "$(Cl \times Ch)/(Cl+Ch)$". In general, since $Cl \ll Ch$, the capacitance Cm is basically equivalent to the capacitance Cl. Capacitance Ch has almost no effect on capacitance Cm, and capacitance Cm depends on capacitance Cl.

When the steering wheel 2 is in a hands-off state, the sensor electrode 21 is electrically capacitance coupled to vehicle ground GND via the air in the vehicle cabin. When the steering wheel 2 is in a hands-on state, in other words, the driver hand 200 is in contact with the rim part 10, proximity of the driver hand 200 shortens the gap d between the sensor electrode 21 and the driver hand 200, causing the sensor electrode 21 to be capacitance coupled with the body of the driver. When the sensor electrode 21 is capacitance coupled to GND, in other words when in a hands-off state, this is capacitance coupled with the ground plane so capacitance becomes very small.

In addition, the capacitance Cl changes with the gap d and is inversely proportional to the gap d. Compared to the case where the driver grips the steering wheel 2 with bare hands, the gap d is wider for the case of gripping the steering wheel 2 while in a state of wearing gloves so the capacitance Cl is smaller.

In other words, capacitance Cm is smallest for the case of not gripping and highest for the case of gripping using bare hands. In the case of gripping in a state of wearing gloves, the capacitance Cm is larger than in the case of not gripping, but smaller than in the case of gripping with bare hands.

On the other hand, the capacitance measuring circuit 14 detects the capacitance coupled to the sensor electrode 21 by the so-called switched capacitor method.

In the switched capacitor method, current is caused to flow to charge the capacitance Cl connected to the sensor electrode 21 and when the electrode voltage of the sensor electrode 21 reaches the target voltage, charging is stopped. The rise rate of the voltage at this time (required time) is related to the current (amount) used for charging and the capacitance and can be expressed using the formula "$T=(Ce \times Ve)/Ic$". Here, Ce is capacitance, Ve is the target voltage, T is the time required to reach the target voltage Ve, and Ic is current.

From this formula, the required time T is a proportional relationship with the capacitance Ce and current Ic, and target voltage Ve are known, so by measuring the required time T using the timekeeping part 142, the capacitance Ce can be calculated.

As described above, in the case of gripping in a state of wearing gloves, the capacitance Cm is greater than for the case of not gripping but smaller than the case of gripping with bare hands so the required time T for the case of gripping in a state of wearing gloves is larger than for not gripping and smaller than the case of gripping with bare hands. In other words, this generates the relationship of "required time T for case of not gripping<required time T for case of gripping in a state of wearing gloves<required time T for case of gripping with bare hands".

The capacitance measuring circuit 14 measures capacitance using two modes with different amounts of current Ic into the capacitance Cl (sensor electrode 21). The two modes include the first mode that uses a first current as the current Ic and the second mode that uses a second current that is larger than the first current. As described below, first mode is where grip determination of hands-on state or hands-off state is performed and second mode is where abnormality determination of whether or not an abnormality has occurred is performed.

The capacitance measuring circuit 14 is provided with a current control unit 141. The current control unit 141 controls the amount of current Ic when performing measurement of capacitance using the switched capacitor method. Specifically, the current control unit 141 outputs the first current in first mode and outputs the second current in second mode.

Furthermore, the capacitance measuring circuit 14 includes a timekeeping part 142. The timekeeping part 142 measures the required time T in first mode and in second mode when detecting the capacitance using the switched capacitor method. In addition, the required time T may be time, number count, or frequency. Furthermore, the timekeeping part 142 measures the elapsed time Tm from start of current flow in first mode and in second mode. The timekeeping results (required time T, elapsed time Tm) from the timekeeping part 142 are sent to the control unit 11.

Figure 5:
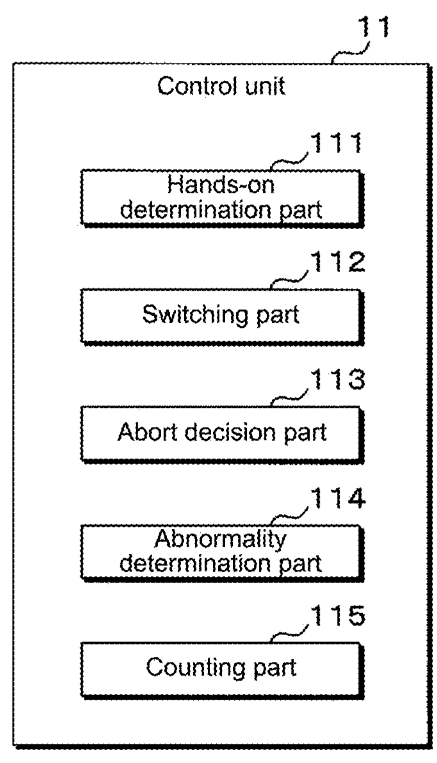
FIG. 5 is a block diagram depicting a configuration of a control unit of the steering wheel device according to the present embodiment.

FIG. 5 is a block diagram depicting a configuration of a control unit 11 of the steering wheel device 100.

The control unit 11 includes a processing unit (not depicted) such as a Central Processing Unit (CPU) or a Micro Processing Unit (MPU). The control unit 11 performs various information processing or control processing related to the hands-on detection ECU 1. In addition, as described above, the control unit 11 determines whether or not the steering wheel 2 is in a hands-on state or a hands-off state (hereinafter called grip determination) based on capacitance coupled to the sensor electrode 21. In addition, the control unit 11 determines whether or not an abnormality that prevents grip determination from being performed normally (hereinafter called abnormality determination) has occurred.

The control unit 11 includes a grip determination part 111, a switching part 112, an abort decision part 113, an abnormality determination part 114, and a counting part 115. The grip determination part 111, switching part 112, abort decision part 113, abnormality determination part 114, and counting part 115 may be configured using hardware logic or may be constructed in software by the CPU executing a prescribed program.

The grip determination part 111 performs grip determination based on the required time T. In first mode, the grip determination part 111 performs hands-off state and hands-on state determination using the threshold value TS1. The threshold value TS1 is between required time T1 corresponding to the case of not gripping and required time T2 corresponding to the case of gripping in a state of wearing gloves (first required time) (see FIG. 6). The required time T1 and T2 can be obtained through testing.

The switching part 112 reciprocally switches mode between the first mode and the second mode based on the elapsed time Tm obtained from the timekeeping part 142. For example, the switching part 112 switches mode based on decision by the abort decision part 113 or switches mode based on determination by the abnormality determination part 114.

The abort decision part 113 decides to abort grip determination based on the elapsed time Tm. The abort decision part 113 decides to abort grip determination in the case that elapsed time Tm exceeds TS2 (first threshold value) while in first mode. The threshold value TS2 is between the required time T2 and required time T3 (second required time) corresponding to the case of gripping with bare hands (see FIG. 6A). The required time T3 can be obtained through testing and the like. Based on decision of the abort decision part 113, the switching part 112 switches from first mode to second mode.

The abnormality determination part 114 performs abnormality determination of whether or not an abnormality has occurred. The abnormality determination part 114 performs abnormality determination in the case that grip determination is aborted by the abort decision part 113. In other words, the abnormality determination part 114 performs abnormality determination by comparing the elapsed time Tm and a threshold value TS3 (second threshold value) after switching to second mode. In second mode, the threshold value TS3 is a time longer than a required time T4 (third required time) corresponding to the case of gripping with bare hands (see FIG. 6B). The required time T4 can be obtained through testing and the like. The switching part 112 switches from second mode to first mode based on determination results of the abnormality determination part 114.

The counting part 115 counts the number of times the abort decision part 113 decides to abort grip determination. The switching part 112 switches from first mode to second mode when there are a plurality of abort decisions by the abort decision part 113.

As depicted in FIG. 2, the steering wheel 2 includes a circular shaped rim part 10 and a hub part 4 arranged in the center of the rim part 10. The hub part 4 has, for example, an airbag (not depicted) installed therein.

The rim part 10 is covered with a coating layer 22 such as leather, and the hub part 4 and spoke parts 3 are covered with, for example, a resin material. The sensor electrode 21 is provided inside of the rim part 10 along the circumferential direction of the rim part 10. The sensor electrode 21 is divided into three equal parts in the circumferential direction and each part is embedded respectively in the rim part 10. Note that the number of sensor electrodes 21 is not limited to three and may be two or less or four or more.

Hereinafter, the case of a rim part 10 having a circular shape will be used for the description, but the rim part of the present invention is not limited to this case. The rim part 10 may be non-circular (for example, D-shaped or C-shaped).

In addition, the hub part 4 is connected to the rim part 10 by means of three spoke parts 3. In other words, in the circumferential direction of the rim part 10, if the upward and downward directions are set as 12 o' clock and 6 o' clock, and the left and right positions are set as 9 o' clock and 3 o' clock, the spoke parts 3 are provided at the 3 o' clock position, the 6 o' clock position, and the 9 o' clock position in the clockwise direction.

An operation panel 20 (operating part) including a plurality of operation buttons to enable the driver to operate on-board devices such as an audio system is provided respectively in the resin material on, of the three spoke parts 3, the 9 o' clock direction spoke part 3 and the 3 o' clock direction spoke part 3, for example.

On the other hand, from the formula "capacitance Cm=(Cl×Ch)/(Cl+Ch)", if the coating layer 22 is very thin or conductive, Cl>>Ch so "capacitance Cm=Ch". In addition, in the case that the driver is gripping with bare hands, there is no Cl so "capacitance Cm=Ch".

However, in the case of gripping in a state of wearing gloves, the thickness of the gloves constitutes a small Cl, so "capacitance Cm=Cl".

Therefore, when performing grip determination, it is necessary to assume not only bare hand grasping but also gripping in a state of wearing gloves to increase the accuracy of the determination, and to configure the system to enable handling the case of "capacitance Cm=Cl" as well as the case of "capacitance Cm=Ch".

However, for detection of capacitance Cm using the switched capacitor method, required time T is in a proportional relationship with capacitance Ce, as described above, so in the case of "capacitance Cm=Ch", in other words in the case the driver is gripping with bare hands, there is the problem that required time T will be long.

Figure 6A:
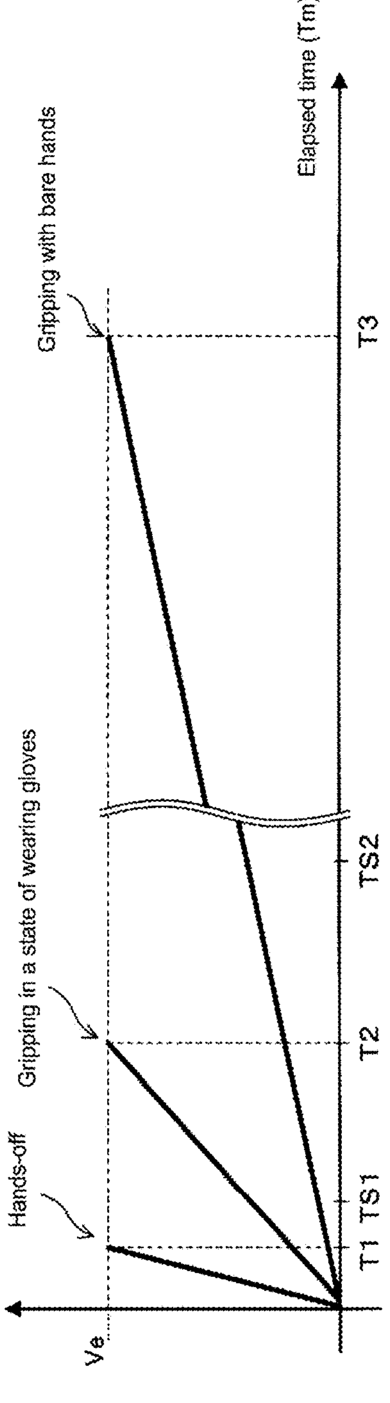
FIG. 6 is a graph indicating the required time T for a first mode and for a second mode.
Figure 6B:
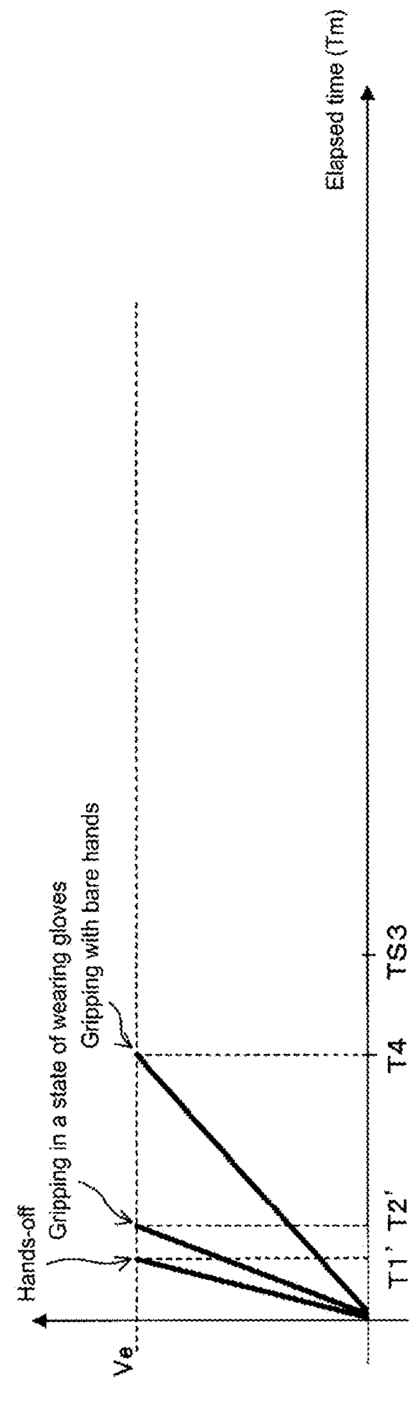

FIG. 6 is a graph indicating the required time T for first mode and for second mode. FIG. 6A depicts first mode and FIG. 6B depicts second mode. In FIG. 6A and FIG. 6B, the vertical axis is electrode voltage and the horizontal axis is elapsed time Tm.

As depicted in FIG. 6A, the time interval between the required time T2 corresponding to gripping in a state of wearing gloves and required time T3 corresponding to the case of gripping with bare hands is much larger compared to the time interval between the required time T1 corresponding to not gripping and the required time T2 corresponding to gripping in a state of wearing gloves.

Thus, when the driver grips with bare hands, the grip determination takes time and is not responsive because the result of the grip determination is not obtained until the required time T3. In addition, this also affects other processing that uses the grip determination results.

A dramatic increase in the current Ic caused to flow into the capacitance Cl can be considered to shorten the required time T to address this type of problem. However, when the magnitude of the current Ic is increased, as indicated in FIG. 6B, although the required time T4 corresponding to the case of gripping with bare hands is shortened, the time interval between the required time T1' corresponding to the case of not gripping and the required time T2' corresponding to gripping in a state of wearing gloves becomes small, and there is risk of erroneous determination in the grip determination.

The steering wheel device 100 according to the present embodiment is configured to address these problems. The details are described below.

Figure 7:
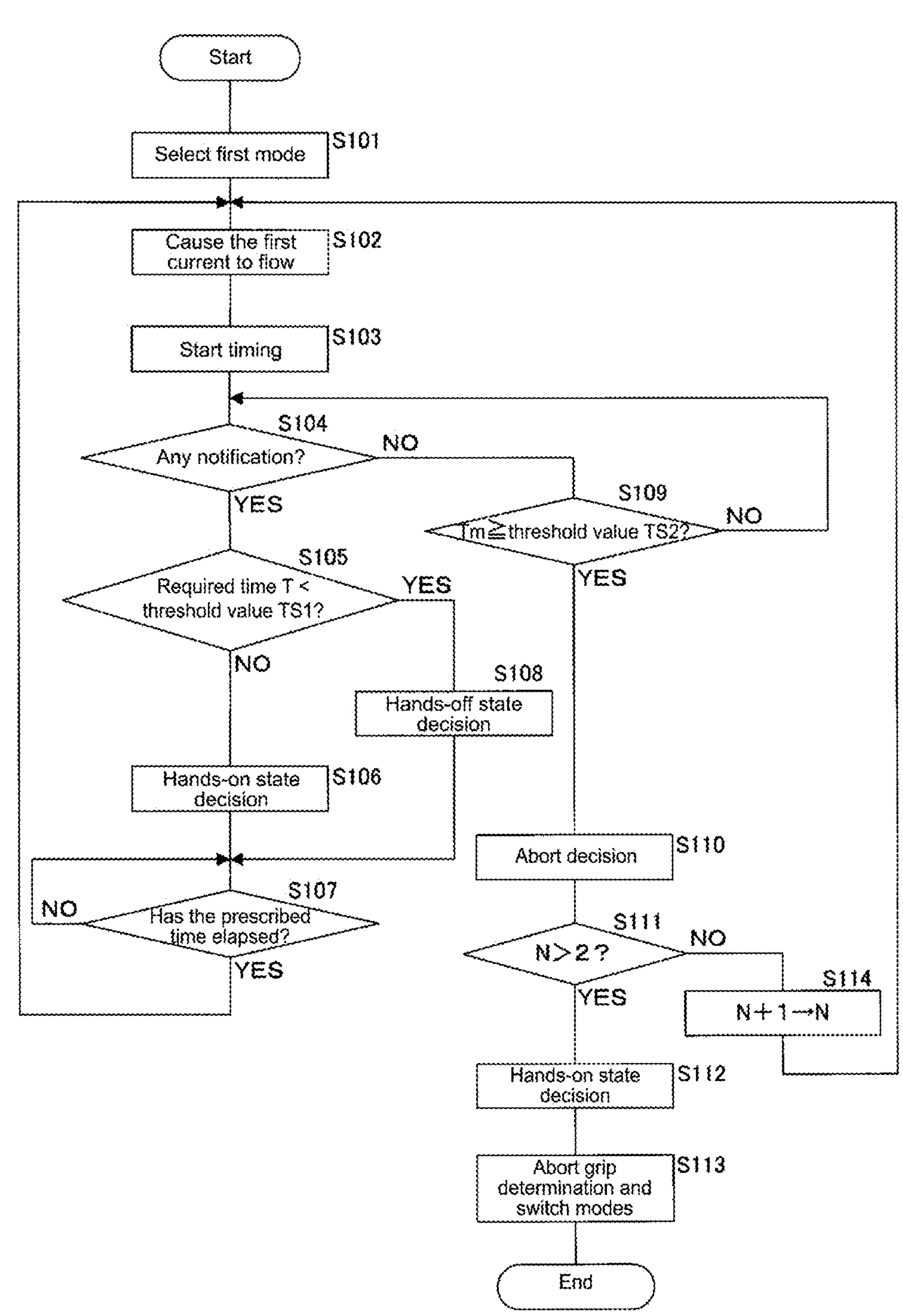
FIG. 7 is a flowchart describing the process of hands-on detection in the steering wheel device according to the present embodiment.

FIG. 7 is a flowchart describing the process of hands-on detection in the steering wheel device 100 according to the present embodiment. FIG. 7 depicts the case of hands-on detection in first mode.

For example, the control unit 11 selects the first mode as the mode used to detect capacitance in response to the transmission of an ignition signal (step S101) and instructs the capacitance measuring circuit 14 to detect capacitance using the first mode.

The capacitance measuring circuit 14 causes the first current to flow into the sensor electrode 21 (capacitance Cl) in response to an instruction by the control unit 11 (step S102). Furthermore, the timekeeping part 142 starts keeping time (step S103). At this time, the counting part 115 assigns 1 to "N", which indicates the number of times the abort decision part 113 has decided to abort the gripping determination, and stores this in the storing part 12.

Immediately thereafter, the control unit 11 determines whether or not notification indicating required time T has been received from the capacitance measuring circuit 14 (step S104). For example, such a notification is an interrupt signal that the capacitance measuring circuit 14 sends to the control unit 11 when the target voltage Ve is reached after the current has been caused to flow.

If the control unit 11 determines that notification indicating the required time T has been received (step S104: YES), in other words, if the required time T has been sent from the capacitance measuring circuit 14, the grip determination part 111 determines whether or not the required time T is shorter than the threshold value TS1 (step S105).

If the grip determination part 111 determines that the transmitted required time T is shorter than the threshold value TS1 (step S105: YES), the grip determination part determines a hands-off state is present (step S108). Thereafter, processing proceeds to step S107. In addition, if the grip determination part 111 determines that the transmitted required time T is not shorter than the threshold value TS1 (step S105: NO), in other words, if the required time T is longer than or equal to the threshold value TS1, the grip determination part determines that a hands-on state is present (step S106).

After the grip determination part 111 determines that the device is in a hands-on state or a hands-off state, the control unit 11 determines whether a prescribed time has elapsed since the start of timing based on the timing result of the timekeeping part 142 (step S107).

When the control unit 11 determines that the prescribed time has not elapsed since the start of timekeeping (step S107: NO), the control unit repeats this determination. In addition, in the case the control unit 11 determines that the prescribed time after starting to keep time has elapsed (step S107: YES), processing returns to step S102.

On the other hand, if the control unit 11 determines in step S104 that there has been no notification indicating the required time T (step S104: NO), in other words, if the required time T has not been transmitted from the capacitance measuring circuit 14, the control unit obtains the elapsed time Tm from the start of timing to the present time from the timekeeping part 142 and determines whether or not the elapsed time Tm is longer than or equal to the threshold value TS2 (step S109).

If the control unit 11 determines that the elapsed time Tm up to the present time is not longer than the threshold value TS2 (step S109: NO), in other words, if the elapsed time Tm up to the present time is shorter than the threshold value TS2, processing returns to step S104. In addition, if the control unit 11 determines that the elapsed time Tm up to the present time is longer than or equal to the threshold value TS2 (step S109: YES), the abort decision part 113 aborts grip determination (step S110).

Next, the control unit 11 refers to the contents stored in the storing part 12 and determines whether or not "N" is greater than 2 (step S111). Here, since "N" stored in the storing part 12 has been assigned the value 1, the control unit 11 determines that "N" is not greater than 2 (step S111: NO), and the counting part 115 assigns “N+1” to “N”, and this is stored in the storing part 12 (step S114). Thereafter, processing returns to step S102.

In addition, if the control unit 11 determines that “N” is greater than 2 (step S111: YES), in other words, if the abort decision part 113 has decided to abort grip determination three or more times, the grip determination part 111 determines that the hands-on state is present (step S112), grip determination is aborted, and the switching part 112 switches the mode from the first mode to the second mode (step S113).

As described above, in the first mode in which a relatively small current is used, when the driver grips the steering wheel 2 with bare hands, grip determination in the case of gripping the steering wheel 2 takes some time. In this regard, if the elapsed time Tm up to the present time is equal to or greater than the threshold value TS2, there is a possibility that the driver is gripping the steering wheel 2 with bare hands; therefore, before the mode is switched by the switching part 112, the grip determination part 111 determines that a hands-on state is present (see step S112).

Thereafter, the first mode is interrupted and processing is continued in second mode.

Figure 8:
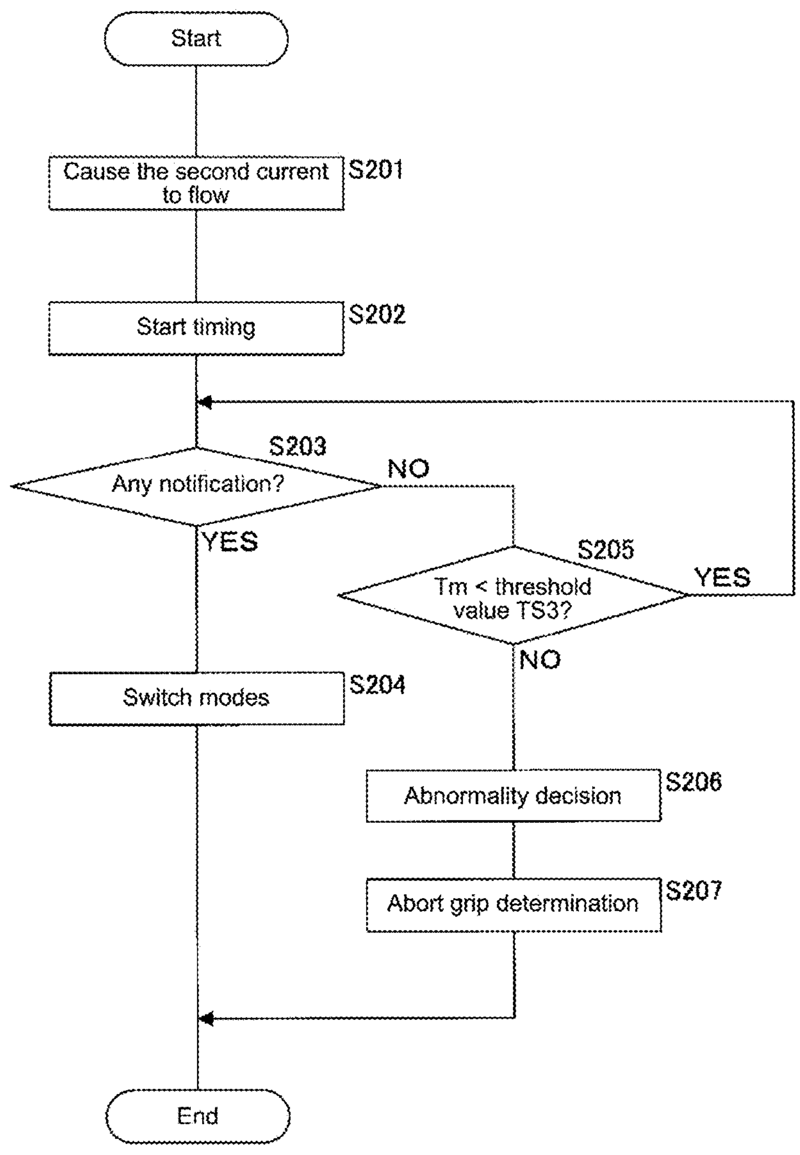
FIG. 8 is a flowchart describing the process of hands-on detection in the steering wheel device according to the present embodiment.

FIG. 8 is a flowchart describing the process of hands-on detection in the steering wheel device 100 according to the present embodiment. FIG. 8 depicts the case of hands-on detection in second mode.

After switching from the first mode to the second mode, the current control unit 141 of the capacitance measuring circuit 14 changes the current used from the first current to a second current that is larger. The second current flows into the sensor electrode 21 (capacitance Cl) (step S201). Furthermore, the timekeeping part 142 starts keeping time (step S202).

Immediately thereafter, the control unit 11 determines whether or not notification indicating required time T has been received from the capacitance measuring circuit 14 (step S203). As described above, the notification is an interrupt signal that the capacitance measuring circuit 14 sends to the control unit 11 when the target voltage Ve is reached after the current has been caused to flow.

If the control unit 11 determines that a notification indicating the required time T has been received (step S203: YES), in other words, if the required time T has been sent from the capacitance measuring circuit 14, the switching part 112 switches the mode from the current second mode to the first mode (step S204). Thereafter, processing ends.

As described above, when the driver grips the steering wheel 2 with bare hands, grip determination takes time. However, if grip determination takes a long time, it is possible that the driver is gripping the steering wheel 2 with a bare hand, or that a failure (abnormality) has occurred for some reason.

Therefore, when a notification is received indicating reaching required time T, it is clear that the reason the grip determination took a long time is not due to a malfunction but due to gripping with bare hands, so the mode is switched from the current second mode to the first mode.

In addition, since a hands-on state is already determined prior to switching to second mode (see step S112), grip determination is performed quickly and accurately.

In addition, in step S203, when the control unit 11 determines that there has been no notification indicating the required time T was reached (step S203: NO), the abnormality determination part 114 performs abnormality determination as to whether or not an abnormality has occurred.

In other words, the abnormality determination part 114 obtains the elapsed time Tm from the start of timekeeping to the present time from the timekeeping part 142, and determines whether the elapsed time Tm is shorter than the threshold value TS3 (step S205).

If the abnormality determination part 114 determines that the elapsed time Tm up to the present time is shorter than the threshold value TS3 (step S205: YES), processing returns to step S203. In addition, if the abnormality determination part 114 determines that the elapsed time Tm up to the present time is not shorter than the threshold value TS3 (step S205: NO), in other words, if the elapsed time Tm up to the present time is equal to or longer than the threshold value TS3, the abnormality determination part determines that an abnormality has occurred (step S206).

In other words, as described above, the threshold value TS3 is longer than the required time T4 corresponding to gripping with bare hands in the second mode (see FIG. 6B), so if the elapsed time Tm up to the current point in time is longer than the threshold value TS3, it is clear that a failure is the reason for taking so long to achieve grip determination.

In this manner, when the abnormality determination part 114 determines that an abnormality has occurred, the control unit 11 stops grip determination (step S207). The configuration may be set to notify the driver thereof if grip determination is stopped.

As described above, in the steering wheel device 100 according to the present embodiment, grip determination is performed in first mode using the first current that is smaller than the second current, and abnormality determination is performed in the second mode using the second current larger than the first current. In other words, by using a smaller current, grip determination is performed in the first mode, which can accurately distinguish between the case of hands-off (required time T1) and gripping in a state of wearing gloves case (required time T2). In addition, by using a larger current, second mode enables gripping with a bare hand to be quickly confirmed and abnormality determination to be performed. Thereby, in the steering wheel device 100 according to the present embodiment, it is possible to achieve both an improvement in hands-on determination speed and an improvement in the hands-on determination accuracy in hands-on detection.

In addition, in the steering wheel device 100 according to the present embodiment, as described above, if the abort decision part 113 decides to abort a plurality of times, switching from the first mode to the second mode is performed, thereby improving the responsiveness of grip determination.

In reality, the determination (result) of a hands-off state is not made in the second mode, but only in the first mode. Therefore, by configuring the switch from the first mode to the second mode to occur only when there are a plurality of abort decisions, the number of first mode, in other words grip determinations, can be increased, thereby making it possible to increase the speed of the grip determination response.

However, the present invention is not restricted to this. The configuration may be such that switching from the first mode to the second mode is performed even if the abort decision part 113 decides to abort only once.

In this case, the number of times abnormality determination is performed in second mode increases, so that the time until an abnormality is detected can be shortened.

As described above, the case where the current control unit 141 provides control between the first current and the second current has been described as an example, but the present invention is not limited to this. For example, a variable resistance element may be provided in such a circuit, and the first current and the second current may be adjusted by controlling the variable resistance element.

MODIFIED EXAMPLE

The present invention is not limited to the above description. The present invention can also be applied to an impedance measurement method.

Figure 9:
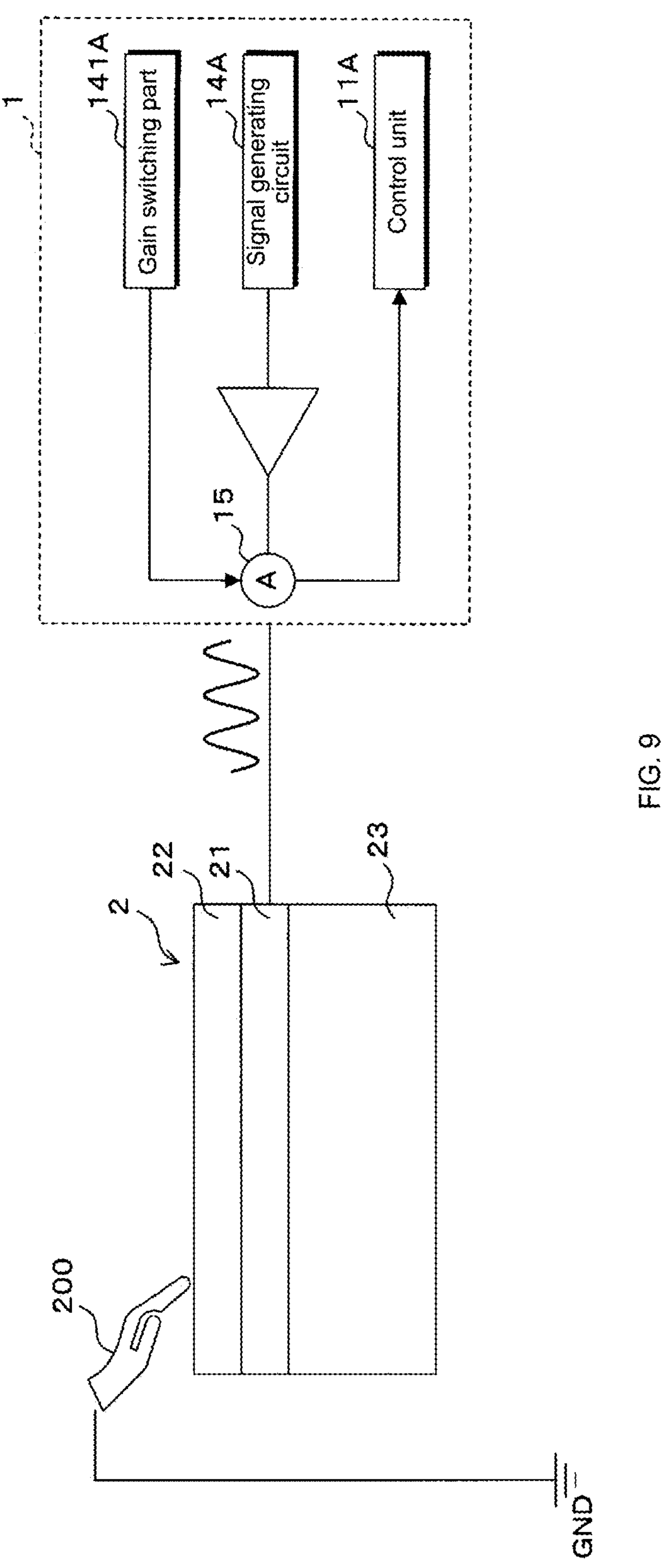
FIG. 9 is a diagram describing a modified example of the process of hands-on detection in the steering wheel device according to the present embodiment.

FIG. 9 is a diagram describing a modified example of the process of hands-on detection in the steering wheel device 100 according to the present embodiment. In the impedance measurement method according to the modified example, a sine wave is applied to a capacitive component (steering wheel 2), and the amount of current flowing out to the sensor electrode 21 is measured and converted into a capacitance value. In the impedance measurement method according to the modified example, the mode is switched by manipulating the gain of the current/capacitance conversion part. Hereinafter, a mode equivalent to the first mode described will be referred to as a first equivalent mode, and a mode equivalent to the second mode will be referred to as a second equivalent mode.

In the steering wheel device 100 according to the modified example, the hands-on detection ECU 1 is also connected to the steering wheel 2. In addition, the steering wheel 2 also has a sensor electrode 21, a coating layer 22, and a urethane layer 23 that covers the core metal, and the sensor electrode 21 is interposed between the coating layer 22 and the urethane layer 23.

The hands-on detection ECU 1 includes a gain switching part 141A, a signal generating circuit 14A, a control unit 11A, and a current measuring part 15.

The current measuring part 15 amplifies the current flowing in the sensor electrode 21 of the steering wheel 2 to measure the current value. The current measuring part 15 outputs the measured current value to the control unit 11A.

The gain switching part 141A switches the gain related to the amplification of the current in the current measuring part 15. In other words, the gain switching part 141A switches the gain depending on whether the mode is the first equivalent mode or the second equivalent mode. For example, when the mode is switched from the first equivalent mode to the second equivalent mode, the gain switching part 141A reduces the gain. In other words, the gain switching part 141A sets the gain in the first equivalent mode (hereinafter referred to as a large gain) larger than the gain in the second equivalent mode (hereinafter referred to as a small gain). The gain switching part 141A corresponds to the current control unit 141 described above.

The signal generating circuit 14A applies a sine wave voltage to the steering wheel 2.

The control unit 11A performs the hands-on detection (grip determination and abnormality determination) described above based on the output (measurement result) from the current measuring part 15. In other words, the control unit 11A corresponds to the control unit 11 described above.

As described above, the steering wheel device 100 according to the modified example is set to the large gain mode in the first equivalent mode, so that small current values can be monitored in detail.

In other words, in the first equivalent mode, a prescribed threshold value corresponding to the threshold value TS1 described above is used to determine a hands-on state and a hands-off state. In addition, in the first equivalent mode, when the sensor is gripped with a bare hand, the gain exceeds the permissible level of the current measuring part 15, causing clipping. In other words, the output signal output to the control unit 11A is inaccurate, and the control unit 11A cannot perform accurate hands-on detection. Here, the permissible level of the current measuring part 15 corresponds to the threshold value TS2 described above. The state in which clipping occurs in this manner can be considered to be the same as the state in which, in the switched capacitor method, the elapsed time Tm reaches the threshold value TS2 in the first mode and a decision is made to abort grip determination.

As described above, when clipping of the current measuring part 15 occurs in the first equivalent mode, the control unit 11A switches from the first equivalent mode to the second equivalent mode. In response to this, the gain switching part 141A switches the present large gain to a small gain. Thereafter, hands-on detection is performed in the small gain mode, in other words, the second equivalent mode, making it possible to monitor a large current value.

In the second equivalent mode, the abnormality determination is performed using a prescribed value corresponding to the threshold value TS3 described above. In other words, in the second equivalent mode, even if gripping using a bare hand, the current measuring part 15 is not clipped, so that determining whether an abnormality has occurred or the device is being gripped with a bare hand is easy.

EXPLANATION OF CODES

- 1. Hands-on detection ECU
- 2. Steering wheel
- 10. Rim part
- 11, 11A. Control unit (hands-on detection part)
- 12. Storing part
- 13. Communicating part
- 14. Capacitance measuring circuit
- 14A. Signal generating circuit
- 15. Current measuring part
- 21. Sensor electrode
- 100. Steering wheel device
- 111. Grip determination part
- 112. Switching part
- 113. Abort decision part
- 114. Abnormality determination part
- 115. Counting part
- 121. Threshold value
- 141. Current control unit
- 141. Gain switching part
- 142. Timekeeping part

The invention claimed is:

1. A hands-on detection device that causes current to flow into an electrode provided in a rim part to perform hands-on detection on the rim part, wherein hands-on detection is performed using two modes with different output currents for hands-on detection, wherein the hands-on detection device is configured such that output current flowing out to the electrode differs for each of the two modes, and wherein the hands-on detection device further comprises:

a hands-on detection part that performs hands-on detection using two modes; and a switching part that switches modes based on elapsed time from start of causing current to flow, wherein the two modes include a first mode that causes a first current to flow and performs grip determination of gripping or non-gripping and a second mode that causes a second current to flow and performs abnormality determination of whether or not an abnormality has occurred.

2. The hands-on detection device according to claim 1, comprising:

an abort decision part that determines aborting of grip determination if elapsed time is greater than a first threshold value in first mode; wherein the switching part switches from the first mode to the second mode based on determination of the abort decision part.

3. The hands-on detection device according to claim 2, wherein grip determination is performed based on required time for the electrode voltage to reach a prescribed voltage and the first threshold value is between a first required time for the case of gripping in a state of wearing gloves and a second required time for the case of gripping with bare hands.

4. The hands-on detection device according to claim 2, wherein if the abort decision part decides to abort grip determination, the hands-on detection part determines that hands-on is present and the switching part switches from first mode to second mode.

5. The hands-on detection device according to claim 2, wherein if grip determination is aborted, the abnormality determination part that performs abnormality determination and the switching part switch from second mode to first mode based on the abnormality determination part determination results.

6. The hands-on detection device according to claim 5, wherein in the case the elapsed time is longer than a second threshold value in the second mode, the abnormality determination part determines that an abnormality is present and said second threshold value is longer than a third required time for gripping with bare hands in second mode.

7. The hands-on detection device according to claim 6, wherein if the third required time is shorter than the second threshold value, the switching part performs switching from the second mode to the first mode.

8. The hands-on detection device according to claim 2, wherein in the case that the number of times the abort decision part decides to abort is a plurality of times, the switching part performs said switching.

9. The hands-on detection device according to claim 1, comprising:

a current measuring part for measuring the current of the electrode;

a hands-on detection part that performs hands-on detection using two modes, the current measuring part having a different amount of gain for the two modes; and a switching part that switches mode based on current value measured in the current measuring part.

10. A hands-on detection device that causes current to flow into an electrode provided in a rim part to perform hands-on detection on the rim part, wherein hands-on detection is performed using two modes with different output currents for hands-on detection, wherein the hands-on detection device is configured such that output current flowing out to the electrode differs for each of the two modes, and wherein the hands-on detection device further comprises:

a current measuring part for measuring the current of the electrode;

a hands-on detection part that performs hands-on detection using two modes, the current measuring part having a different amount of gain for the two modes; and a switching part that switches mode based on current value measured in the current measuring part.

* * * * *